V. J. LUONGO.
DENTAL TOOL.
APPLICATION FILED JULY 27, 1917.

1,278,066.  Patented Sept. 3, 1918.

Inventor
Vincent J. Luongo
By Attorney

UNITED STATES PATENT OFFICE.

VINCENT J. LUONGO, OF BROOKLYN, NEW YORK.

DENTAL TOOL.

1,278,066.      Specification of Letters Patent.      Patented Sept. 3, 1918.

Application filed July 27, 1917. Serial No. 183,156.

*To all whom it may concern:*

Be it known that I, VINCENT J. LUONGO, a citizen of the United States, residing at Brooklyn, New York city, in the county of Kings and State of New York, have invented certain new and useful Improvements in Dental Tools; and I do hereby declare the following to be a full, clear, and exact description of the invention, such as will enable others skilled in the art to which it appertains to make and use the same.

My invention relates to dental tools, and the object thereof is to provide a tool of this character which will facilitate the taking of impressions of cavities, teeth, and spaces between teeth.

To the accomplishment of the recited objects, and others coördinate therewith, the preferred embodiment of my invention resides in that arrangement and construction shown in the accompanying drawings, hereinafter described, and embraced within the scope of the appended claim.

Figure 1:
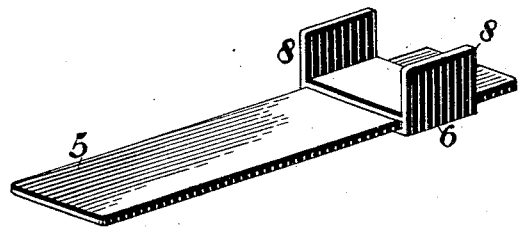

In said drawings, Figure 1 is a perspective view of the complete device.

Figure 2:
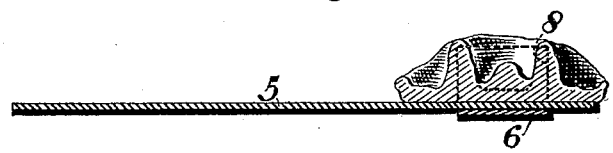
Figure 3:
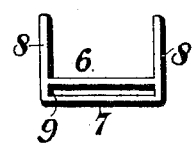

Fig. 2 is a side elevation of the tool showing the position of the wax or other substance, subsequent to the taking of the impression, and Fig. 3 is an end elevation of the tool.

Referring more particularly to the drawings, the numeral 5 designates a relatively thin, flat bar, and 6 the container for any suitable impression-receiving substance. In the form exhibited in the drawings, the container comprises a base 7 and a pair of vertically extending side portions 8, the base being slotted as at 9 for the reception of the bar 5.

In use, the container 6 is filled or partially filled with wax, or any other similar substance, whereupon the said container is suitably adjusted with respect to the bar 5, and the end of the bar carrying the container inserted in the mouth of the patient. The impression is secured in an obvious manner and the instrument is then withdrawn, the container detached, and the bar 5 thoroughly sterilized so that it may be used almost instantly as a support for another container, which of course will be in readiness.

During the operation of taking the impression, the vertically disposed side members 8 serve to effectively brace the impression-receiving substance and thereby prevent its lateral displacement. It will also appear manifest that the container may be varied in form and size in accordance with any particular requirement. Another very important feature is that the invention in its entirety is extremely simple, comprising only two parts, each of which can be quickly and thoroughly sterilized, or otherwise treated to render them perfectly sanitary. Still another point is that the bar 5 constitutes a combined handle and support, and either extremity of the bar may be used either as a handle or as a support.

What is claimed is:

A dental impression wax holder comprising a handle of thin flat material having straight edges, a holder slidable on said handle and removable therefrom comprising a slotted base to receive said handle, vertically extending rectangular side walls rising above said slotted base to form an impression wax holder, said holder having open ends, said handle and holder being adapted to have extensions of said handle from the opposite edges of said slotted base, and said holder being disposed to receive impression wax therein which in usage is restricted against lateral displacement, but which may be extended longitudinally through the open ends of said holder to overlie portions of the handle in proximity to the slotted base, said flat handle serving as a base against which pressure from one of the jaws of a patient is imparted to the impression wax holder.

In testimony whereof I affix my signature in presence of two witnesses.

VINCENT J. LUONGO.

Witnesses:
    WILLIAM C. JONES,
    LUCBOCK DAGMER.